United States Patent
Menon et al.

(10) Patent No.: US 11,144,361 B2
(45) Date of Patent: *Oct. 12, 2021

(54) SYSTEM AND METHOD FOR AUTOMATIC DEPENDENCY ANALYSIS FOR USE WITH A MULTIDIMENSIONAL DATABASE

(71) Applicant: ORACLE INTERNATIONAL CORPORATION, Redwood Shores, CA (US)

(72) Inventors: Vinod Padinjat Menon, San Jose, CA (US); Kumar Ramaiyer, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,126

(22) Filed: Oct. 21, 2019

(65) Prior Publication Data

US 2020/0050496 A1 Feb. 13, 2020

Related U.S. Application Data

(63) Continuation of application No. 15/332,943, filed on Oct. 24, 2016, now Pat. No. 10,467,251.

(60) Provisional application No. 62/245,880, filed on Oct. 23, 2015, provisional application No. 62/411,473, filed on Oct. 21, 2016.

(51) Int. Cl.
*G06F 9/50* (2006.01)
*G06F 16/28* (2019.01)
*G06F 16/245* (2019.01)

(52) U.S. Cl.
CPC .......... *G06F 9/5066* (2013.01); *G06F 16/283* (2019.01); *G06F 16/245* (2019.01)

(58) Field of Classification Search
None
See application file for complete search history.

(56) References Cited

U.S. PATENT DOCUMENTS

| | | |
|---|---|---|
| 5,850,554 A | 12/1998 | Carver |
| 6,980,988 B1 | 12/2005 | Demers et al. |
| 2003/0120708 A1* | 6/2003 | Pulsipher ............... G06F 9/4881 718/106 |
| 2007/0156634 A1 | 7/2007 | Martin |
| 2009/0030915 A1* | 1/2009 | Winter ................. G06F 16/283 |
| 2011/0224984 A1 | 9/2011 | Anguera Miro et al. |
| 2011/0276966 A1* | 11/2011 | Christensen .......... G06F 9/5038 718/100 |
| 2012/0079498 A1* | 3/2012 | Kim ...................... G06F 9/5066 718/104 |
| 2013/0191439 A1 | 7/2013 | Kern et al. |
| 2014/0337289 A1 | 11/2014 | Mulukutla et al. |

(Continued)

*Primary Examiner* — Christopher J Raab
(74) *Attorney, Agent, or Firm* — Tucker Ellis LLP

(57) ABSTRACT

In accordance with an embodiment, described herein is a system and method for dependency analysis for a calculation script in a multidimensional database computing environment. A multidimensional database cube aggregation can be represented as a lattice of blocks or cube, arranged according to a database outline (e.g., intra-dimensional or member hierarchy). When the multidimensional database system performs computations in parallel for a given calculation script, portions of the cube that can be computed concurrently are identified.

20 Claims, 9 Drawing Sheets

(56) References Cited

U.S. PATENT DOCUMENTS

2015/0135192 A1* 5/2015 Takahashi ............ G06F 9/4843
                                                    718/105
2016/0306896 A1  10/2016 Paradies et al.

* cited by examiner

SYSTEM AND METHOD FOR AUTOMATIC DEPENDENCY ANALYSIS FOR USE WITH A MULTIDIMENSIONAL DATABASE

CLAIM OF PRIORITY

This application is a continuation of and claims the benefit of priority to U.S. Patent Application entitled "System and method for automatic dependency analysis for use with a multidimensional database", application Ser. No. 15/332,943, filed on Oct. 24, 2016, which application claims the benefit of priority to U.S. Provisional Application titled "SYSTEM AND METHOD FOR AUTOMATIC DEPENDENCY ANALYSIS FOR USE WITH A MULTIDIMENSIONAL DATABASE", Application No. 62/245,880, filed Oct. 23, 2015; and U.S. Provisional Application titled "SYSTEM AND METHOD FOR PROVIDING A MULTIDIMENSIONAL DATABASE", Application No. 62/411,473, filed Oct. 21, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to online analytical processing and multidimensional database computing environments, and to systems and methods for use of efficient dependency analysis on an underlying lattice.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein is a system and method for dependency analysis for a calculation script in a multidimensional database computing environment. A multidimensional database (e.g., Essbase) cube aggregation can be represented as a lattice of blocks arranged according to a database outline (e.g., intra-dimensional or member hierarchy). When the multidimensional database system performs computations in parallel for a given calculation script, portions of the cube that can be computed concurrently are identified.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
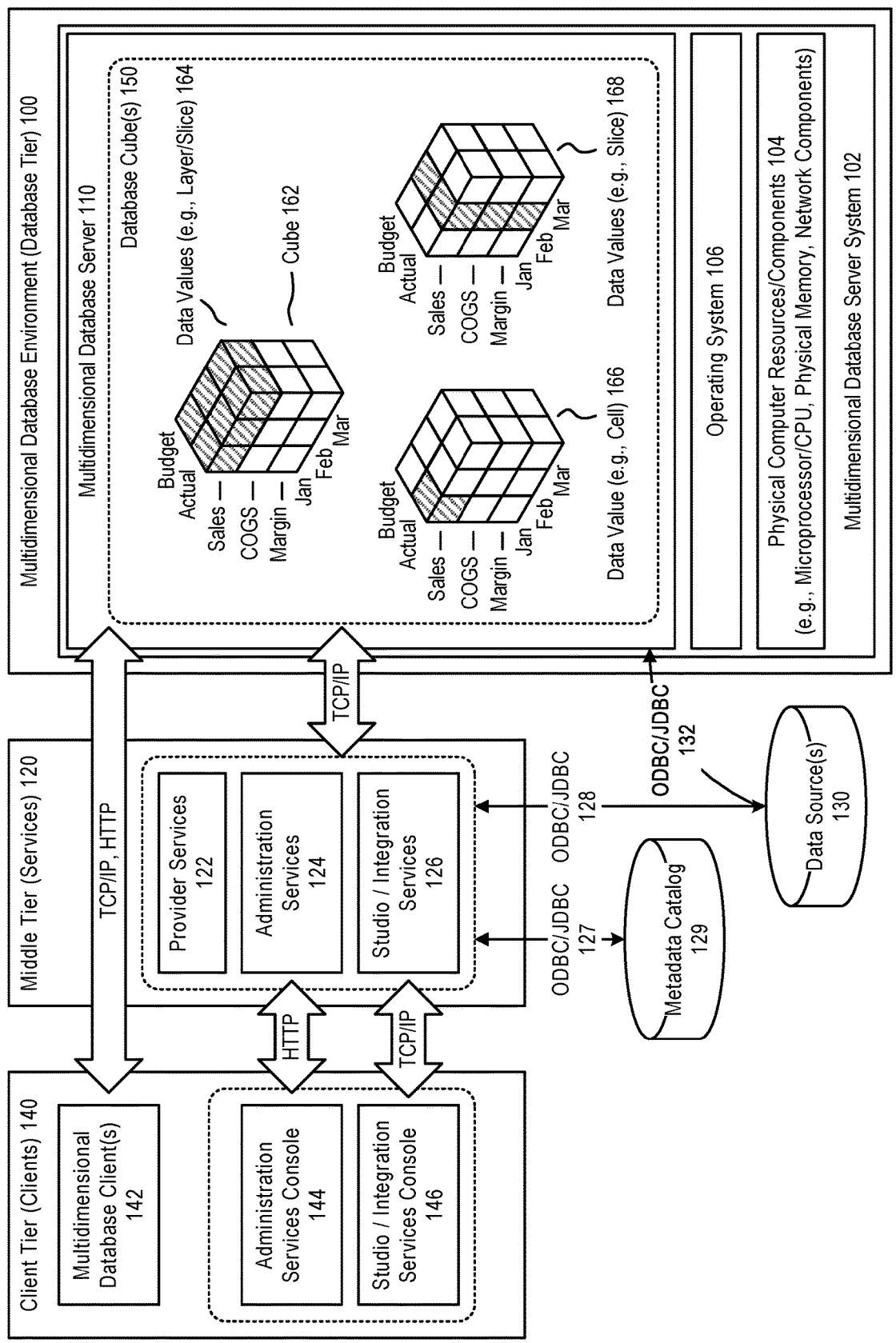
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142

(e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific at a value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-In

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Automatic Dependency Analysis

In accordance with an embodiment, described herein is a system and method for dependency analysis for a calculation script in a multidimensional database computing environment. A multidimensional database (e.g., Essbase) cube aggregation can be represented as a lattice of blocks arranged according to a database outline (e.g., intra-dimensional or member hierarchy). When the multidimensional database system performs computations in parallel for a given calculation script, portions of the cube that can be computed concurrently are identified.

Parallel Calculation

In accordance with an embodiment, a multidimensional database system provides two ways of invoking a calculation: either the calculation may be implicitly specified by an outline itself; or the calculation may be explicitly specified by a calculation script that an administrator or other user creates, wherein the script contains formulas and calculation instructions. Regardless of how a calculation is triggered, the system can execute the calculation in one of two modes:

Serial calculation is the default. With serial calculation, each calculation pass is scheduled to run on a single processor or thread. If invoked from a calculation script, the calculations are executed sequentially in the order in which they appear in the calculation script.

Parallel calculation breaks each calculation pass into sub-tasks. The sub-tasks that can run independently of one another are scheduled to run simultaneously on a plurality of threads (e.g. 64 threads, 128 threads, or more or less depending on the capabilities of the computer system).

In accordance with an embodiment, a sub-task can be a calculation of a particular data block. A data block contains data associated with all dense dimension members for a particular combination of sparse dimension members. Based on the database outline, calculations for some data blocks can be dependent on calculations of other data blocks. That is, when a dependency exists between a first block and a second block (i.e. the second block is dependent on the first block), the calculation of the first block occurs before the calculation of the second block.

A dependency, such as in the example described above, creates a level along the sparse dimensions defining the data blocks. A level boundary or sync point represents a division in a parallel calculation where all tasks from a first group of concurrent tasks must complete before any tasks from a second group of concurrent tasks commence.

By way of example, tasks from the first group can include calculations of data blocks defined by sparse dimensions members at a lower database outline level than members defining the data blocks calculated in the second group. This group division can lead to situations where multiple calculation threads are idle while waiting for a particular group to finish.

Dependency Lattice Reduction

In accordance with an embodiment, for a given calculation that can performed in parallel, a calculation order is determined by the multidimensional database environment. The calculation order can be based on a database outline, for example, using a bottom-up approach so that child blocks aggregate up to parent blocks.

For instance, blocks associated with leaf level sparse dimension members can be calculated first, before moving to calculate blocks associated with higher level members. Such an arrangement indicates that the blocks associated with higher level members have a dependency on calculations of blocks associated with the lower level members. These dependencies, when graphed, create a dependency lattice representing an order in which blocks for sparse dimension members are to be calculated.

The dependency lattice can identify blocks which are independent (i.e., having no dependency therebetween), but mutually depend on a lower level block. Thus, the dependency lattice can include concurrency levels. Each concurrency level can include one or more tasks (e.g., calculations of one or more data blocks) that can be performed in parallel. Tasks in higher concurrency levels wait until all tasks at lower concurrency levels are completed. Accordingly, while calculations are concurrently performed in parallel within a concurrency level, each concurrency level is handled serially.

According to an embodiment, the multidimensional database environment identifies one or more task dimensions for a calculation. The task dimensions are sparse dimensions, whose members define data blocks. For instance, each data block in the calculation includes data of dense dimensions members for a particular combination of members from each task dimension. A dependency analysis on the data blocks can create a dependency lattice to determine a calculation order. With parallel calculations, the calculation may execute more efficiently as the number of levels in the dependency lattice decreases.

FIGS. 2-5 illustrate a parallel calculation in a multidimensional database environment according to an embodiment.

Figure 2:
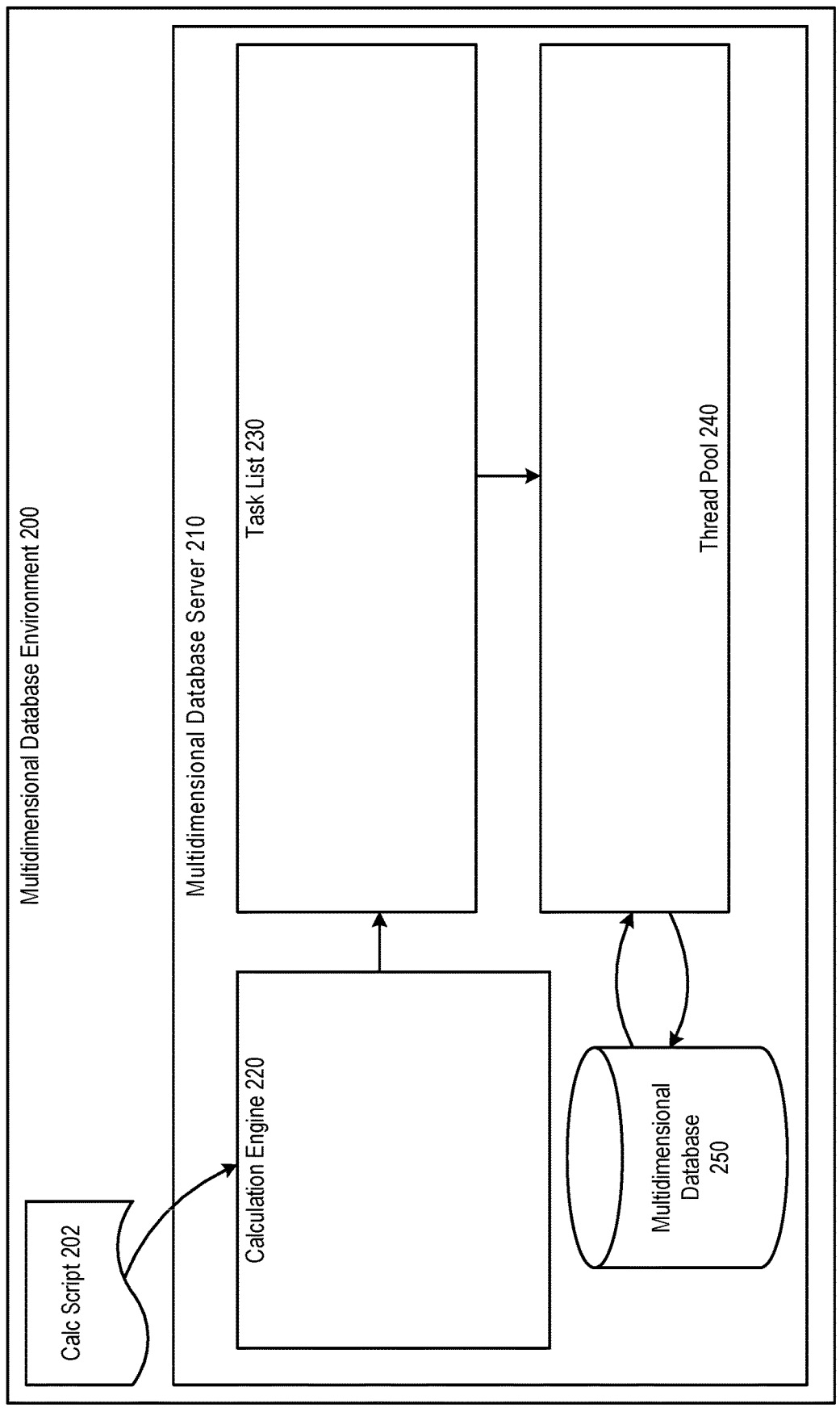
FIG. 2 illustrates a parallel calculation within a multidimensional database environment in accordance with an embodiment.

As illustrated in FIG. 2, a multidimensional database environment (e.g., Essbase) 200 can include or provide a database server 210 that manages user requests and administers a multidimensional database 250. While multidimensional database 250 is depicted as a part of database server 210, it is to be appreciated that multidimensional database 250 can be distributively stored by a plurality of servers, maintained on a separate server communicatively coupled to database server 210 via a network or as part of a cluster, or otherwise accessible to database server 210 for administration, data retrieval, data storage, or data calculation.

The database server 210 provides a calculation engine 220 to carry out calculations or other operations requested by users. For instance, a user can supply a calculation script 202 to calculation engine 220. The calculation script 202 can include various commands and/or operations to be performed on multidimensional database 250. Based on the calculation script 202, the calculation engine 220 can generate a plurality of tasks to fulfil a desired operation and add the tasks to a task list or queue 230. In an example, the plurality of tasks included in the task list 230 can be sub-tasks of a larger operation specified in the calculation script 202.

According to an aspect, task list 230 includes independent tasks capable of being carried out simultaneously or in parallel. To support parallel execution, a main thread (utilized by the calculation engine 220 to process the calculation script 202 and generate task list 230) can create one or more child threads to be a used as a thread pool 240 to execute tasks of tasks list 230. After execution of all tasks by thread pool 240, the main thread of calculation engine 212 can resume and proceed to perform additional operations in calculation 220, if any.

Figure 3:
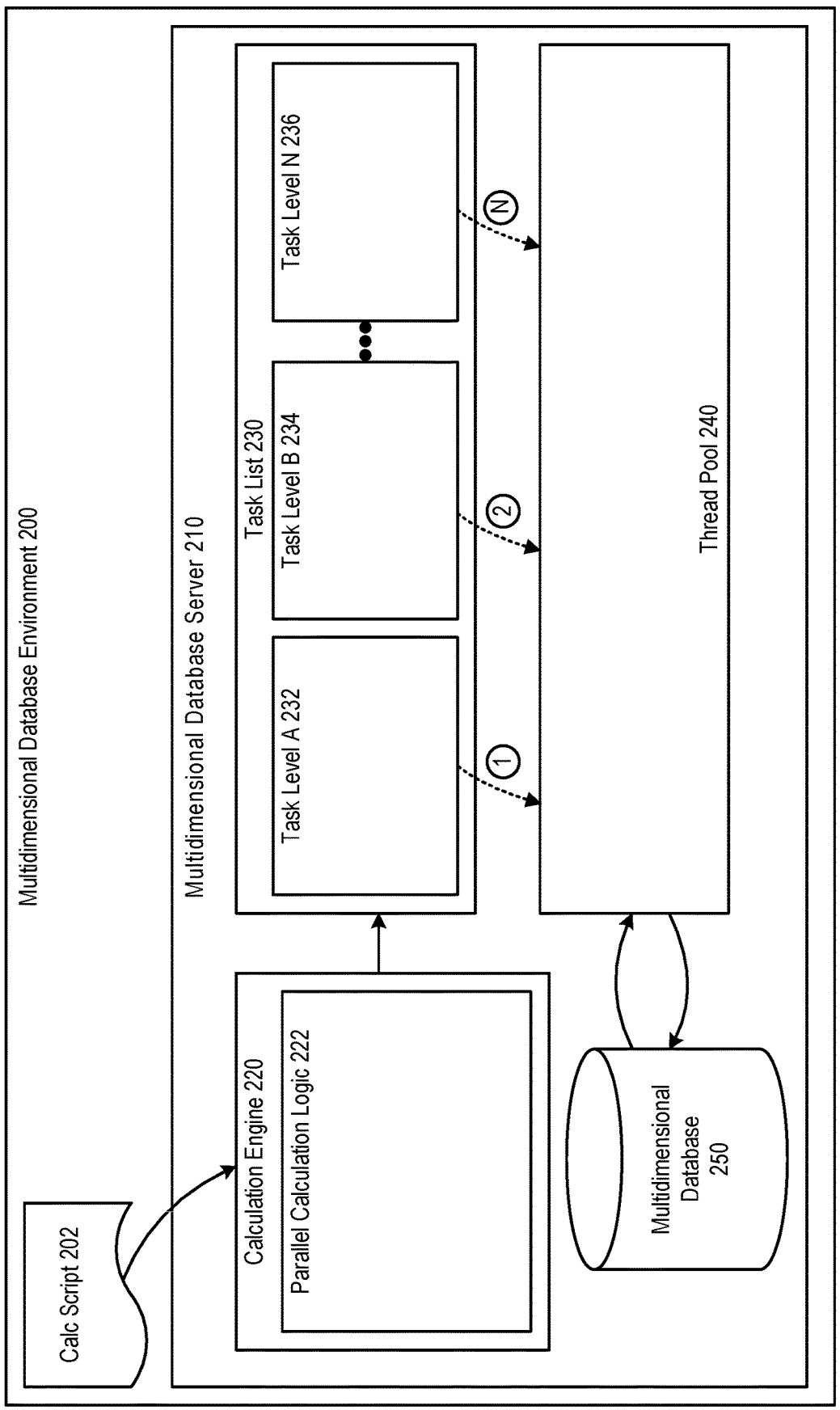
FIG. 3 further illustrates a parallel calculation within a multidimensional database environment in accordance with an embodiment.

As shown in FIG. 3, calculation script 202 can include commands that invokes parallel calculation logic 222 of calculation engine 220. The parallel calculation logic 222 segments a calculation into a plurality of tasks (also referred to as sub-tasks), which are added to task list 230 for parallel execution by thread pool 240. The parallel calculation logic 222 creates the plurality of tasks based on one or more task dimensions, which can be a subset of sparse dimensions of the multidimensional database. Each task can involve calculation of one or more data blocks, where each data block includes data associated with a specific combination of members from each task dimension. In general, as a number of task dimensions increases, the tasks grow smaller and more numerous.

Based on a dependency analysis, the created tasks can be grouped into levels. For instance, tasks having no dependencies on other tasks can be grouped into a lowest level, e.g. Task Level A 232. Any tasks with dependencies to tasks from Task Level A 232 can be grouped together into Task Level B 234. This grouping process can continue level-by-level until the last tasks are grouped into a highest level, e.g. Task Level N 236, where N is any integer.

In accordance with an embodiment, the task levels determine a calculation order. For instance, tasks from Task Level A 232 can be executed first, followed by tasks from Task Level B 234. Level-by-level execution proceeds until Task Level N 236, after which the calculation completes.

Figure 4:
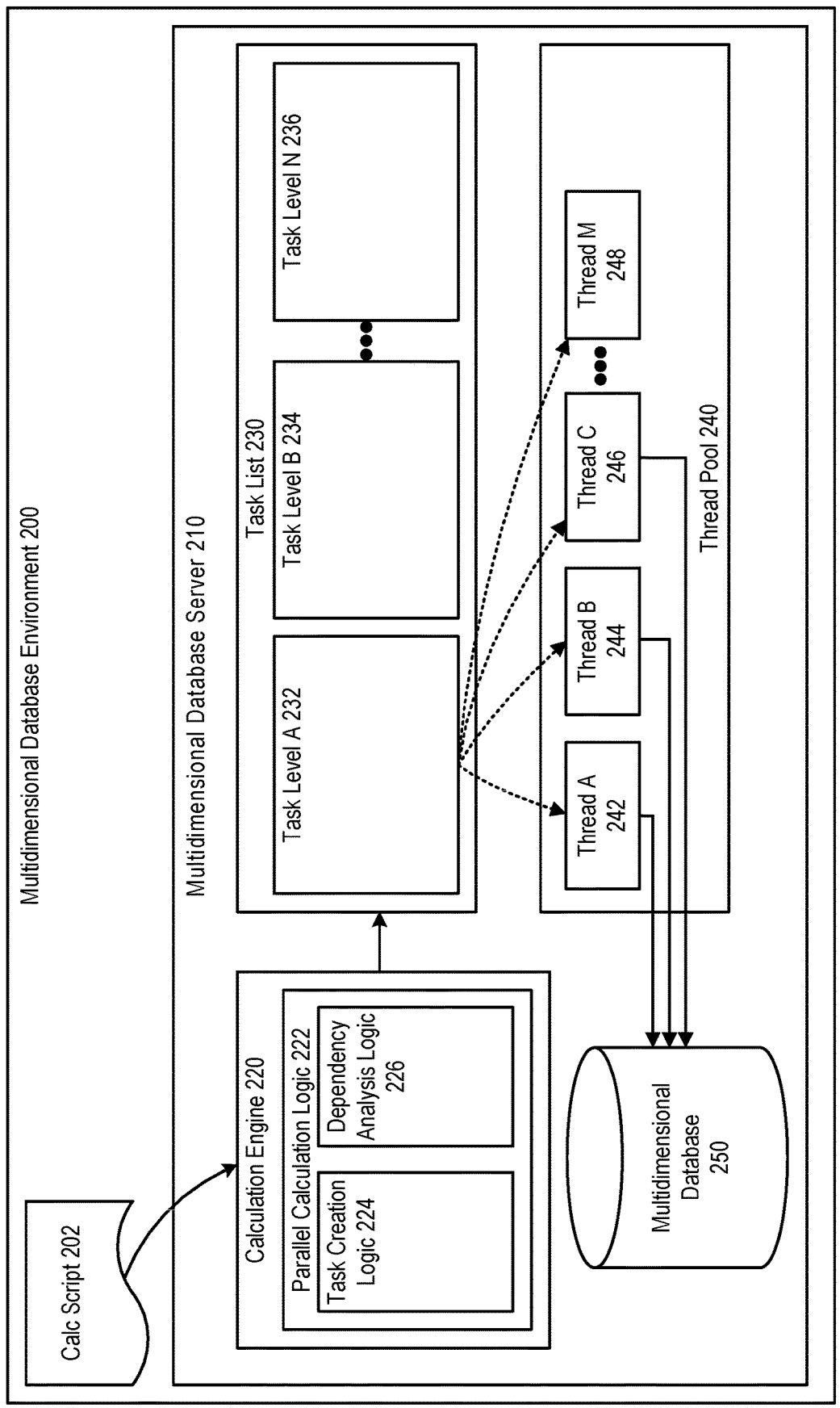
FIG. 4 further illustrates a parallel calculation within a multidimensional database environment in accordance with an embodiment.

FIG. 4, in accordance with another embodiment, illustrates concurrency execution of respective task levels. As shown, task creation logic 224 generates task list 230 based on a calculation from calculation script 202. Task creation logic 224 utilizes a set of task dimensions to break up a calculation into sub-tasks. According to an example, the task dimensions can be automatically selected based on heuristics, configured by a user, or specified by the calculation script 202.

With tasks created, dependency analysis logic 226 can perform dependency analysis on task list 230 to partition the tasks into levels. For example, dependency analysis logic 226 identifies tasks that depend on other tasks (i.e. tasks that must wait for other tasks to complete before being executed) and identifies tasks that can be independently calculated in parallel.

As shown in FIG. 4, once tasks levels are determined, each task level is executed using thread pool 240 such that respective tasks of a task level are executed in parallel by one or more threads. For example, thread pool 240 can include Thread A 242, Thread B 244, Thread C 246, and so on up to Thread M 248, where M is any integer. Tasks from a particular level are distributed among threads of thread pool 240 for concurrent execution.

Figure 5:
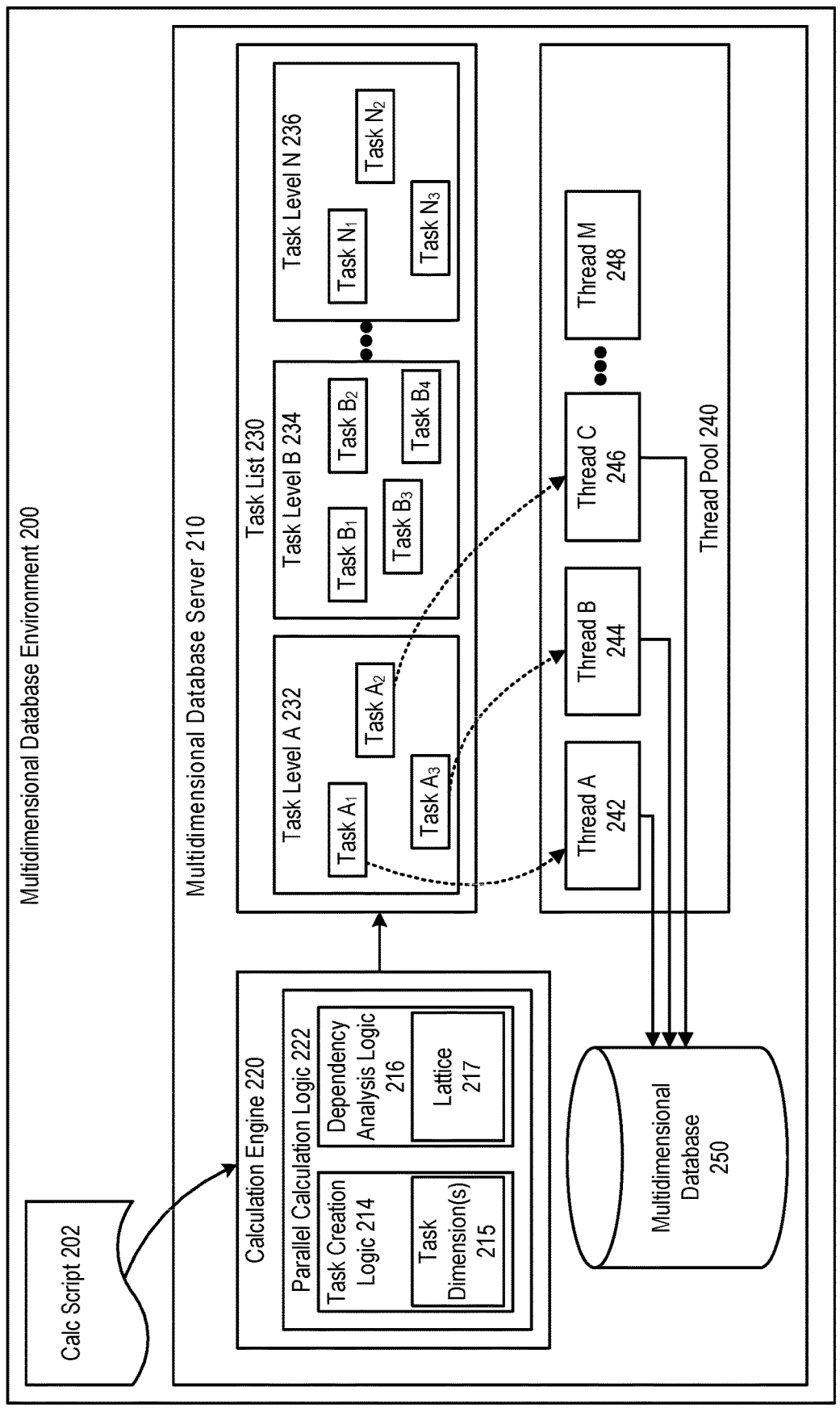
FIG. 5 further illustrates a parallel calculation within a multidimensional database environment in accordance with an embodiment.

In general, a parallel calculation executes more efficiently when a number of task levels is small. Turning to FIG. 5, in accordance with an embodiment, the parallel calculation logic 222 can identify particular conditions to optimize parallel calculation. In particular, based on a task dimension(s) 215 for a calculation script 202, a lattice 217 generated by dependency analysis logic 216 can be reconfigured to improve efficiency of the parallel calculation.

To illustrate, task dimensions 215 can include a sparse dimension that is not participating in the calculation. The task creation logic 214 can identify this non-participating dimension and mark it as such. When grouping a task into a level based on lattice 214, the parallel calculation logic 222 can ignore dependency between members of the marked dimensions and only consider dependencies between members of unmarked dimensions (e.g. task dimensions which do participate in the calculation).

Accordingly, tasks associated with members of the marked dimension, which are nominally dependent, can be grouped into one level since the marked dimension is not participating in the calculation. Since the dimension is not involved in the actual calculation, it is not required that higher level members of that dimension wait for lower level members to be calculated first.

In an example, Task Level A 232 can include Tasks $A_1$, $A_2$, $A_3$, which can be associated with different members of a non-participating dimension. These tasks may also be associated with identical members of participating task dimensions. Accordingly, these tasks can be grouped into the same level, e.g. Task Level A 232, and executed concurrently by a thread pool 240 as shown.

Exemplary Parallel Calculations

By way of example, consider a multidimensional database environment in which D, E, F are dense dimensions and L, M, P, C, G are sparse dimensions. Based on heuristics, a calculation engine can determine that P, C and G are task dimensions along which tasks are generated. In accordance with this example, P, C and G are aggregating dimensions, but may not be aggregating in every calculation script.

Figure 6:
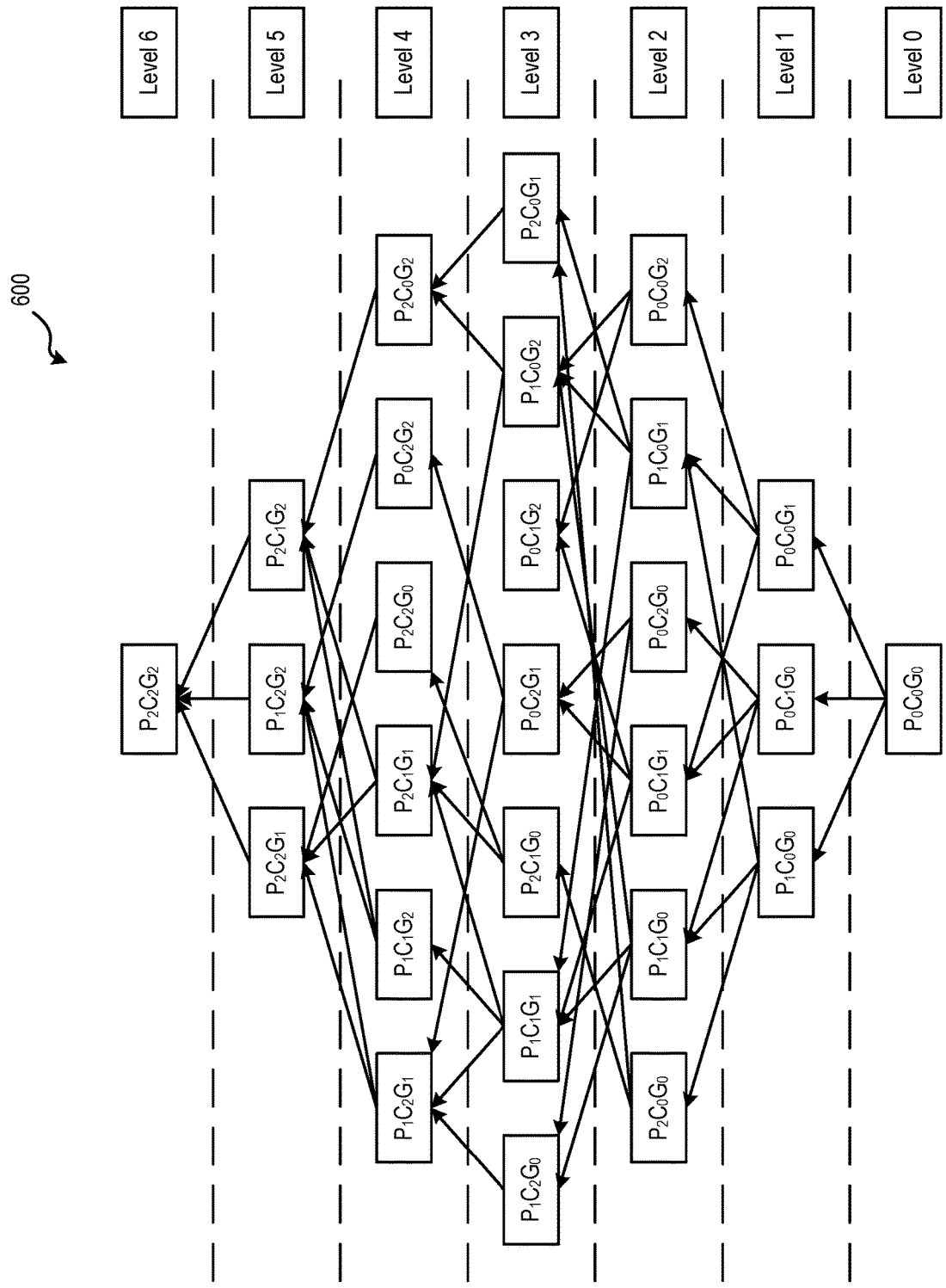
FIG. 6 illustrates a dependency lattice for a parallel calculation in a multidimensional database environment in accordance with an embodiment.

FIG. 6 illustrates a dependency lattice 600 for the following calculation:

CALC DIM (P, C, G)

In this calculation, all task dimensions are aggregated. As shown in FIG. 600, this calculation involve many dependencies and results in 7 tasks levels. In FIG. 6, $P_n$, $C_n$ and $G_n$ represent level n of dimensions P, C and G, respectively. $P_0$, $C_0$ and $G_0$ represent lowest level members or leaf level members of the respective task dimensions. $[P_i C_j G_k]$ indicates a Cartesian product of members from level i of dimension P, from level j of dimension C, and from level k of dimension G. Within the context of the calculation, the Cartesian product represents a collection of data blocks included in a particular sub-task. Further, an arrow from one task to another indicates a dependency, where the direction of the arrow implies an order of calculation.

A typical calculation flow based on lattice 600 begins by loading values associated with leaf level blocks, e.g. $P_0 C_0 G_0$. Then blocks are calculated and aggregated upwards according to the dependencies indicated by lattice 600. The multidimensional database environment can calculate each level of lattice 600 in parallel. Before starting a new level, the calculation engine waits for all tasks from a previous level to finish. In an aspect, these periods where the calculation must wait before proceeding can be referred to as sync point.

In contrast to the calculation flow for lattice 600, no sync points are created if the calculation is a dense calculation. For example, given the following calculation:

FIX (IDESCENDANTS(P), IDESCENDANTS(C), IDESCENDANTS(G))
CALC DIM (D, E, F)
END FIX

In this calculation, only the dense dimensions D, E and F are calculated. The task dimensions are not aggregating or participating in this particular calculation. Accordingly, the dependency lattice 600 does not need to be strictly enforced. In fact, with this calculation, all dependencies can be removed such that all tasks or all blocks can be concurrently calculated.

Generalizing between the two examples, many calculations will involve intermediate situations where one or more task dimensions do not participate. For example, consider the following script:

FIX (IDESCENDANTS(P))
CALL DIM (C, G)
END FIX

Here, dimension P, although a task dimension, is not participating in the calculation. Only dimensions C and G are participating. Accordingly, sync points do not need to be generated along the P dimension. That is, the dependencies between members of dimension P can be ignored.

Figure 7:
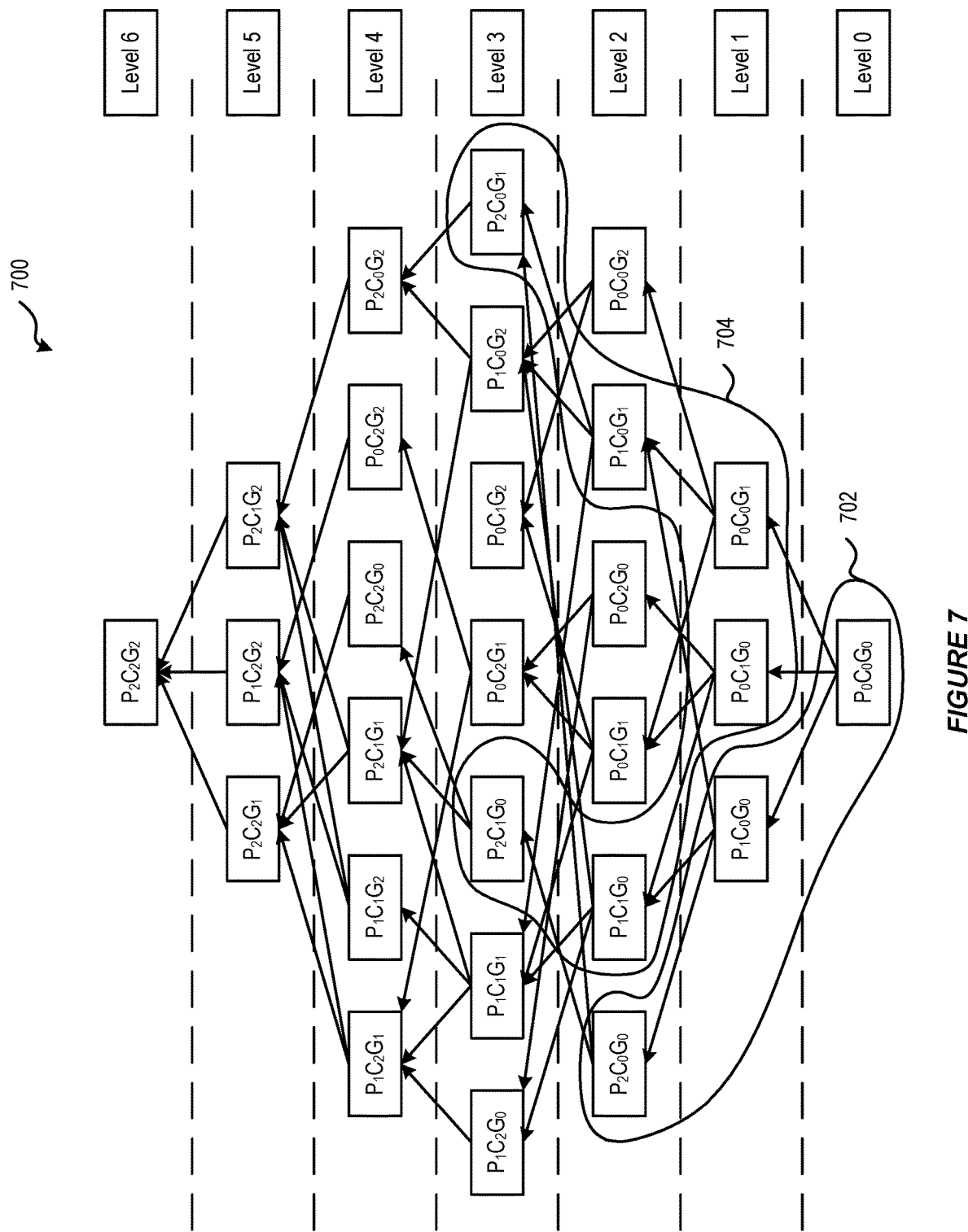
FIG. 7 illustrates a dependency lattice for a parallel calculation in a multidimensional database environment in accordance with an embodiment.

FIG. 7 illustrates this feature. A lattice 700 is depicted, which is similar to lattice 600. Since dimension P is not participating in the calculation, the tasks included in group 702 can calculated in parallel at the same time, even though the tasks nominally exist at different levels. In other words, the sync points between those tasks are not created (i.e. the dependencies are ignored or removed). As shown, group 702 includes task associated with the combination $C_0 G_0$ in connection with all members of dimension P. Once the tasks of group 702 are done, the tasks of group 704 can be computed in parallel at the same time. Group 702 includes tasks associated with the combinations $C_1 G_0$ and $C_0 G_1$ with all member of dimension P.

Figure 8:
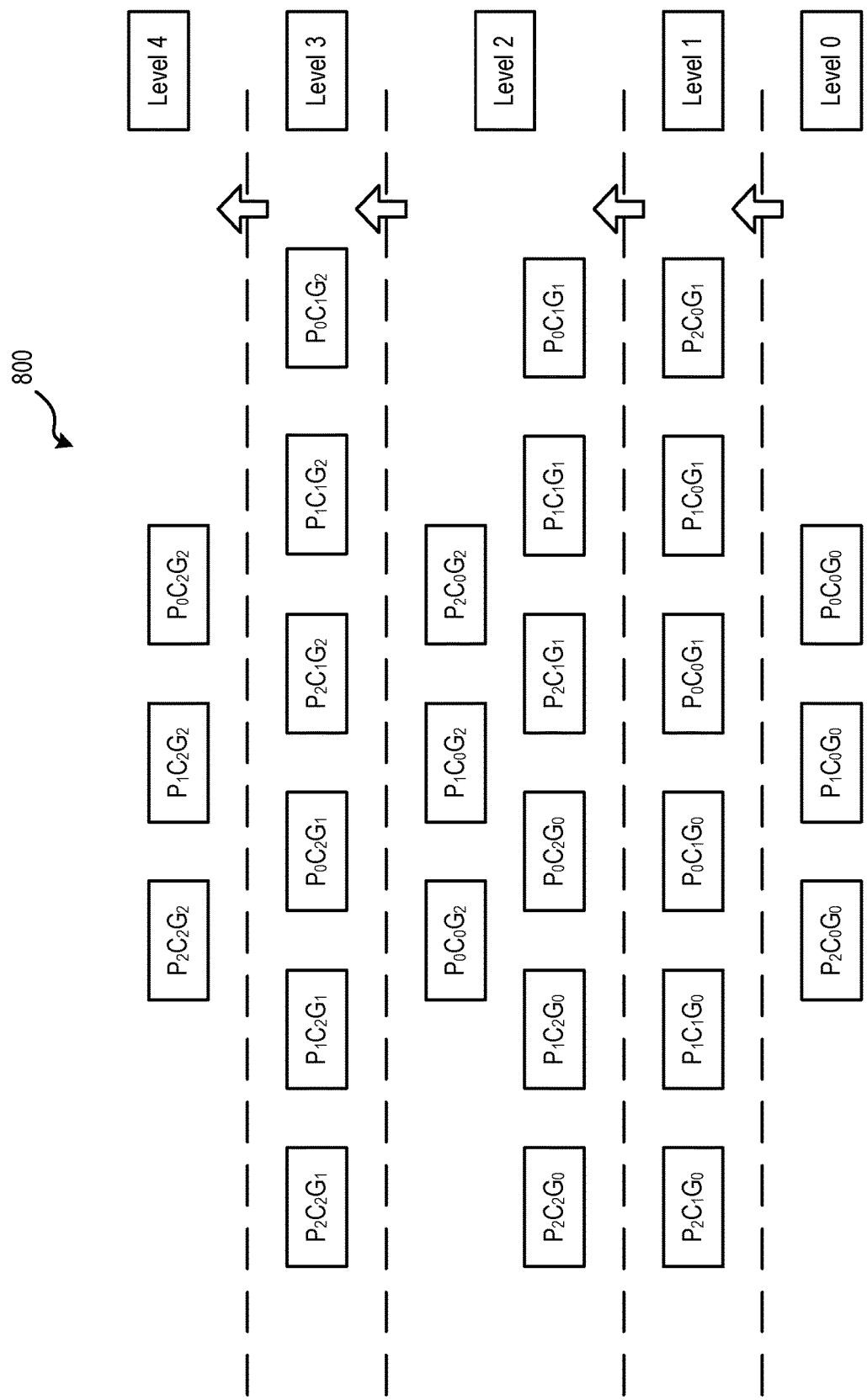
FIG. 8 illustrates a reduced dependency lattice for a parallel calculation in a multidimensional database environment in accordance with an embodiment.

Continuing to group tasks in this manner reduces lattice 700 to lattice 800 illustrated in FIG. 8. As shown, with the recognition that dimensions is not participating, the calculation reduces from 7 levels to 5 levels. With the reduction levels, more tasks are concurrently calculated at each level.

In accordance with an embodiment, parallel calculation task creation creates groups of member from dimensions P, C and G. Members within each dimension are divided into dependency levels and a cross product is taken to create a dimensional lattice as shown above. Next, the multidimensional database environment identifies whether each of the task dimensions participates in the calculation or not. If a dimension is not participating, all members from this dimension are placed in the same level. This process can be repeated if another task dimension is also not participating in the calculation.

For a given script, the calculation order of each dimension is tracked. If a dimension is not participating in a calculation, the dimension is be marked appropriately. For each of the task dimensions, this property is checked. For any marked dimension, only one level or dependency group is created and all members are put in this group.

Figure 9:
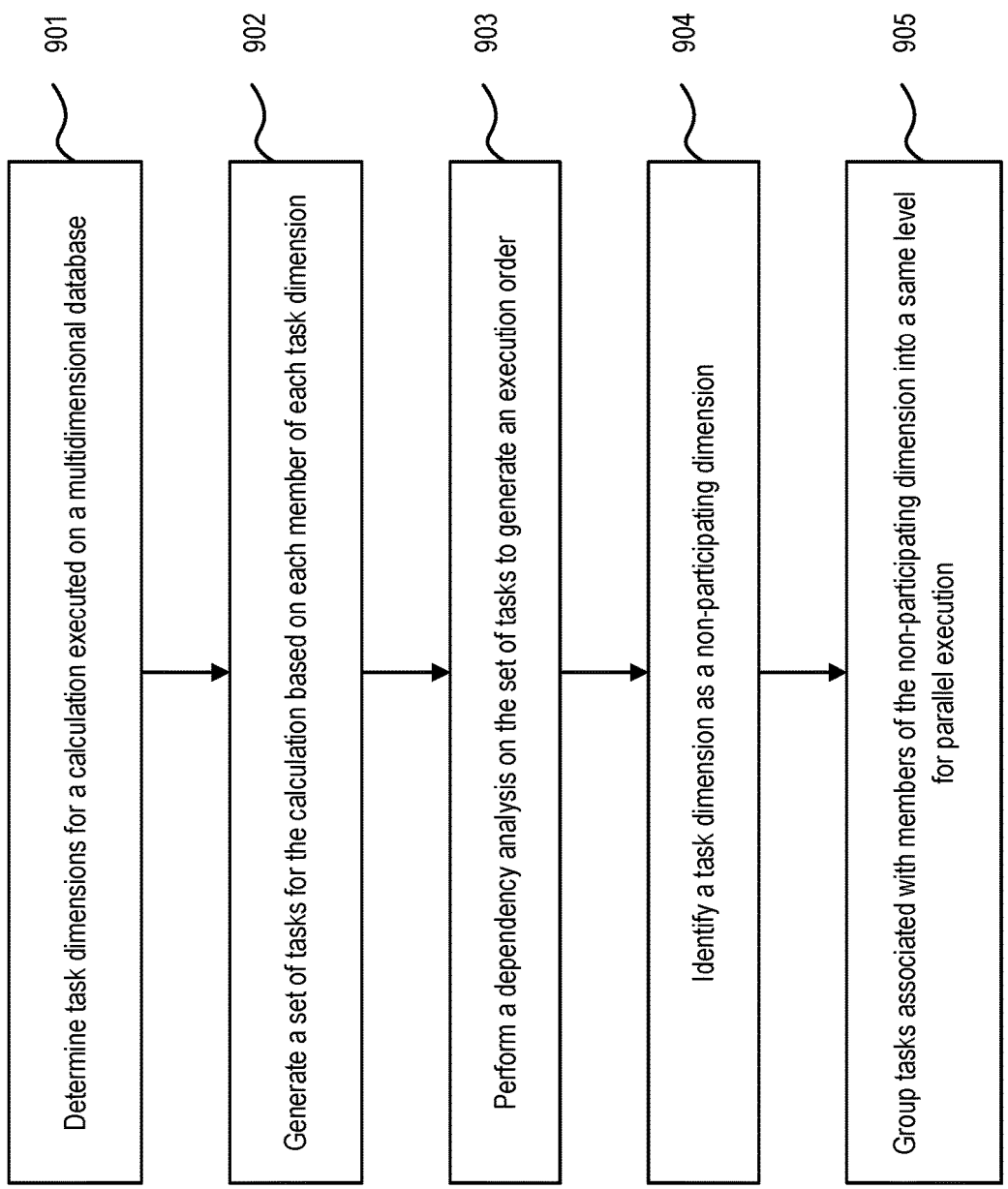
FIG. 9 illustrates a flow chart describing a parallel calculation within a multidimensional database environment in accordance with an embodiment.

FIG. 9 illustrates a flow chart describing a parallel calculation within a multidimensional database environment in accordance with an embodiment. As illustrated in FIG. 9, at step 901, task dimensions are determined for a calculation executed on a multidimensional database.

At step 902, a set of tasks are created based on combinations of members from each task dimension.

At step 903, a dependency analysis is performed on the set of tasks to generate an execution order.

At step 904, a task dimension is identified as a non-participating dimension.

At step 905, tasks associated with members of the non-participating dimension are grouped in a same level for parallel execution.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of an Oracle Essbase multidimensional database environment, in accordance with various embodiments the components, features, and methods described herein can be used with other types of online analytical processing or multidimensional database computing environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing parallel calculation within a multidimensional database environment, comprising:
   a multidimensional database for storing data associated with a plurality of dimensions; and
   a computing device having a processor executing instructions that cause the processor to:
      determine a set of task dimensions for an operation on the multidimensional database, wherein a task dimension comprises a sparse dimension of the multidimensional database;
      generate a plurality of tasks for the operation based on respective members of respective task dimensions of the set of task dimensions, wherein each task of the plurality of tasks calculates at least one data block associated with one or more members of the task dimensions;
      identify a non-participating dimension in the set of task dimensions based on the plurality of tasks;
      determine a plurality of task levels based on the plurality of tasks, the plurality of task levels including a first task level that includes a first set of tasks associated with participating dimensions determined to have no dependencies on other tasks and tasks associated with members of the non-participating dimension; and
      execute, in parallel, tasks included in the first task level to calculate one or more data blocks.

2. The system of claim 1, wherein members of the task dimensions define data blocks of the multidimensional database.

3. The system of claim 1, wherein tasks associated with the non-participating dimension includes dense calculations.

4. The system of claim 1, wherein the non-participating dimension does not participate in calculations associated with the plurality of tasks.

5. The system of claim 1, wherein the plurality of task levels includes a second task level that includes a second set of tasks determined to have dependencies of the first set of tasks.

6. The system of claim 5, wherein tasks included in the second tasks level are executed in parallel after execution of the first task level.

7. The system of claim 1, wherein the tasks associated with members of the non-participating dimensions include a task for each member of the non-participating dimensions in association with identical members of other task dimensions.

8. A method for parallel calculation in a multidimensional database, comprising:
   determining a set of task dimensions for an operation on the multidimensional database, wherein a task dimension comprises a sparse dimension of the multidimensional database;
   generating a plurality of tasks for the operation based on respective members of respective task dimensions of the set of task dimensions, wherein each task of the plurality of tasks calculates at least one data block associated with one or more members of the task dimensions;
   identifying a non-participating dimension in the set of task dimensions based on the plurality of tasks;
   determining a plurality of task levels based on the plurality of tasks, the plurality of task levels including a first task level that includes a first set of tasks associated with participating dimensions determined to have no dependencies on other tasks and tasks associated with members of the non-participating dimension; and
   executing, in parallel, tasks included in the first task level to calculate one or more data blocks.

9. The method of claim 8, wherein members of the task dimensions define data blocks of the multidimensional database.

10. The method of claim 8, wherein the non-participating dimension does not participate in calculations associated with the plurality of tasks.

11. The method of claim 8, wherein the plurality of task levels includes a second task level that includes a second set of tasks determined to have dependencies of the first set of tasks.

12. The method of claim 11, further comprising executing, in parallel, tasks included in the second task level after execution of the first task level.

13. The method of claim 8, wherein the tasks associated with members of the non-participating dimensions include a task for each member of the non-participating dimensions in association with identical members of other task dimensions.

14. A non-transitory computer-readable storage medium having instructions stored thereon, which when read and executed by a computer, cause the computer to:
   determine a set of task dimensions for an operation on a multidimensional database, wherein a task dimension comprises a sparse dimension of the multidimensional database;
   generate a plurality of tasks for the operation based on respective members of respective task dimensions of the set of task dimensions, wherein each task of the plurality of tasks calculates at least one data block associated with one or more members of the task dimensions;
   identify a non-participating dimension in the set of task dimensions based on the plurality of tasks;
   determine a plurality of task levels based on the plurality of tasks, the plurality of task levels including a first task level that includes a first set of tasks associated with participating dimensions determined to have no dependencies on other tasks and tasks associated with members of the non-participating dimension; and
   execute, in parallel, tasks included in the first task level to calculate one or more data blocks.

15. The non-transitory computer-readable storage medium of claim 14, wherein the instructions further configure the computer to:
   identify the non-participating dimension based on a calculation script for the operation; and
   determine a calculation order for the plurality of tasks based on a dependency analysis, wherein the calculation order is determined utilizing a single level dependency group for all members of the non-participating dimension.

16. The non-transitory computer-readable storage medium of claim 14, wherein members of the task dimensions define data blocks of the multidimensional database.

17. The non-transitory computer-readable storage medium of claim 14, wherein the non-participating dimension does not participate in calculations associated with the plurality of tasks.

18. The non-transitory computer-readable storage medium of claim 14, wherein the plurality of task levels includes a second task level that includes a second set of tasks determined to have dependencies of the first set of tasks.

19. The non-transitory computer-readable storage medium of claim 18, wherein the instructions further configure the computer to execute, in parallel, tasks included in the second task level after execution of the first task level.

20. The non-transitory computer-readable storage medium of claim 14, wherein the tasks associated with members of the non-participating dimensions include a task for each member of the non-participating dimensions in association with identical members of other task dimensions.

\* \* \* \* \*

UNITED STATES PATENT AND TRADEMARK OFFICE
CERTIFICATE OF CORRECTION

PATENT NO. : 11,144,361 B2
APPLICATION NO. : 16/659126
DATED : October 12, 2021
INVENTOR(S) : Menon et al.

Page 1 of 1

It is certified that error appears in the above-identified patent and that said Letters Patent is hereby corrected as shown below:

In the Specification

In Column 3, Line 32, delete "at a" and insert -- data --, therefor.

In Column 9, Line 5, delete "600," and insert -- 6, --, therefor.

In Column 9, Line 9, delete "$[P_iC_iG_k]$" and insert -- $[P_iC_jG_k]$ --, therefor.

In Column 10, Line 18, after "is" insert -- to --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*